Aug. 9, 1955  J. O. CREEK ET AL  2,714,765
INDEXING MEANS FOR DIRECT READING GAUGE APPARATUS
Filed June 12, 1951  2 Sheets-Sheet 1

INVENTORS
J.O.CREEK
E.W.DAWSON
PER

ATTORNEY.

Aug. 9, 1955 J. O. CREEK ET AL 2,714,765
INDEXING MEANS FOR DIRECT READING GAUGE APPARATUS
Filed June 12, 1951 2 Sheets-Sheet 2
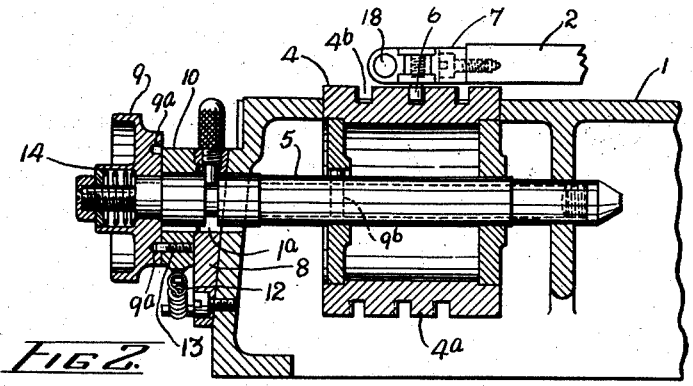
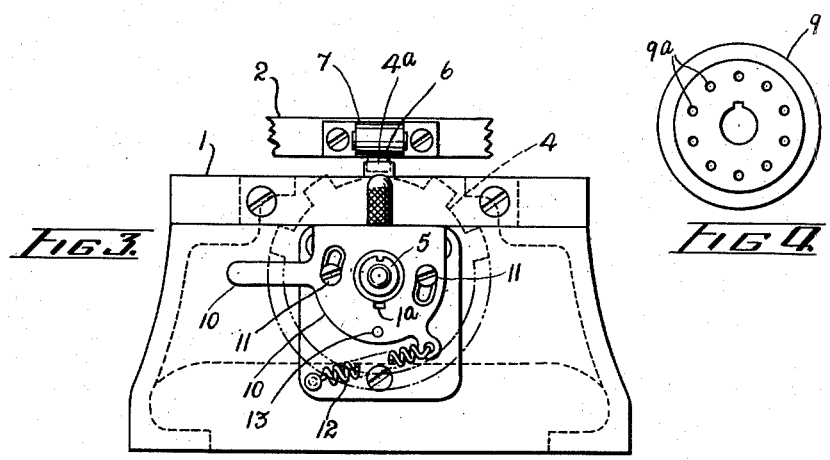
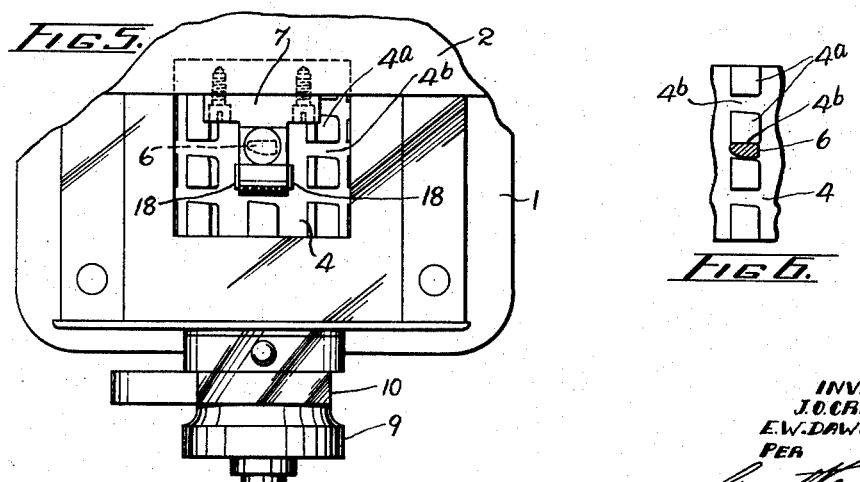
INVENTORS
J. O. CREEK
E. W. DAWSON
PER
ATTORNEY

United States Patent Office 2,714,765
Patented Aug. 9, 1955

2,714,765

INDEXING MEANS FOR DIRECT READING GAUGE APPARATUS

John Oliver Creek, Brampton, Ontario, and Edward William Dawson, Toronto, Ontario, Canada, assignors to A. V. Roe Canada Limited, Malton, Ontario, Canada, a corporation Application June 12, 1951, Serial No. 231,136

3 Claims. (Cl. 33—174)

This invention relates to a direct-reading gauge apparatus which will enable the accuracy of manufacture of a multiplicity of similar parts to be readily checked.

In engineering, various types of gauges are used for checking or indicating the accuracy of manufacture of parts. For example, it is common practice to mount a part in a shadowgraph apparatus, which compares visually on a screen a large scale reproduction of a pair of feeler arms, set to measure the part, with a correspondingly enlarged scale drawing of the part. When checking a large number of parts of complicated external shape, which consequently necessitates the checking of several dimensions of each part, the above method is too slow. Moreover, a reading is not given in actual figures for comparison with the dimensions specified on the drawing.

The main object of the present invention is, therefore, the provision of a direct-reading gauge apparatus in which similar parts can be successively mounted and accurate readings readily obtained of several predetermined dimensions of each part, to enable the actual dimensions of the parts to be checked against the figures specified for these dimensions.

The invention is particularly applicable to the manufacture of the blades of the turbines and compressors of gas turbine engines, where it is necessary to check the accuracy of a large number of blades of complicated form. In such an engine the blade forms vary from stage to stage of the compressor of both the stator and the rotor, so that it is necessary to check series of differently shaped blades. Another object of the present invention is, consequently, the provision of apparatus comprising means to enable different series of parts to be readily gauged.

The invention is hereafter particularly described and is illustrated with reference to the accompanying drawings, in which:

Fig. 2 is a sectional view of the carriage locating mechanism used in this apparatus;

Fig. 3 is an end view of Fig. 2 with the hand knob shown in Fig. 2 removed;

Fig. 4 is a rear view of the knob;

Fig. 5 is a plan view of the indexing mechanism; and

Fig. 6 is a fragmentary view showing the engagement of the stop pin in a recess.

Figure 1:
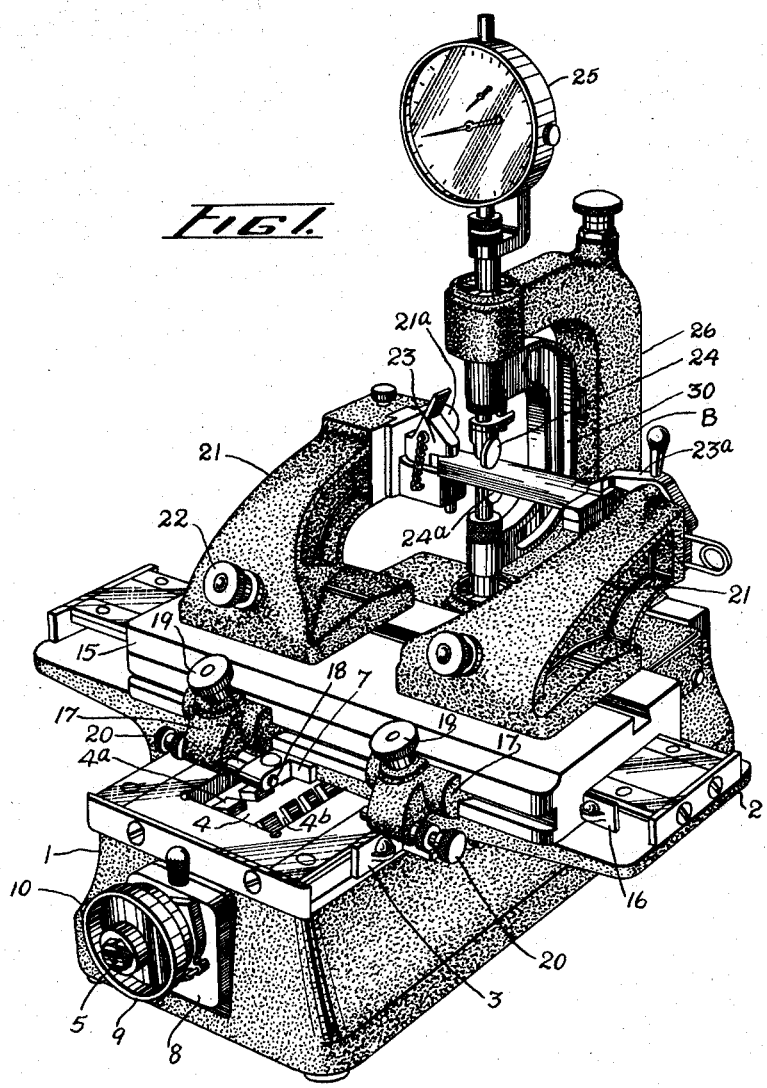
Fig. 1 is a perspective view of an apparatus particularly adapted to gauge the compressor blades of a gas turbine engine.

By reference to Fig. 1, it will be seen that the apparatus comprises a base 1 on which is slidably mounted a carriage 2 in what will be described throughout the specification as the longitudinal direction or axis of the apparatus. A pair of linear ball bearings 3 is provided at each side of the base 1 to ensure that the said carriage 2 whilst being freely slidable in the longitudinal direction, is maintained in accurate relationship to the base 1 in the transverse and vertical directions.

The location of the carriage 2 in relation to the base 1 in the longitudinal direction is determined by the following mechanism. As can be seen in Fig. 1 and is shown more clearly in Figs. 2 and 3, a locating drum 4 is mounted on a spindle 5 for rotation in the base 1 about an axis parallel to the direction of movement of the carriage. The axial position of the drum 4 in relation to the base 1 of the apparatus is accurately determined by means of lapped faces formed on the base 1 adjacent each end of the hub of the drum 4. On the peripheral surface of the drum 4 is a series of equally spaced longitudinal ridges $4^a$; and transverse slots or recesses $4^b$ are machined in the ridges $4^a$. An accurately machined and hardened stop pin 6 is carried by a bracket 7 secured to the underside of the carriage 2 and is adapted to engage in any one of the recesses $4^b$ to lock the carriage 2 against longitudinal movement with respect to the base 1. By counterclockwise rotation of the drum 4, the stop pin 6 is released from the recess $4^b$ it happens to be engaged in, whereby the said stop pin 6 is free to slide longitudinally between the longitudinal ridges $4^a$, and hence the carriage 2 is also free to slide on the base 1 and may be moved back and forth. As shown in Fig. 6, to ensure that the carriage 2 is accurately located by the stop pin 6 and coacting recess $4^b$ of the drum 4, one pair of contacting faces of the stop pin 6 and each recess $4^b$ lies parallel to a transverse vertical plane of the apparatus and serve to locate the carriage 2, whilst the other pair of contacting faces of the stop pin 6 and each recess $4^b$ is inclined to said transverse vertical plane to produce a wedge action when the drum 4 is rotated in a clockwise sense to engage the stop pin 6 in a recess $4^b$.

In order to remove the stop pin 6 from engaging position with the recesses in one ridge and place it in engaging position with the recesses of another ridge it is necessary first to move the carriage 2 longitudinally forward, that is to the left in Fig. 2, until the pin 6 emerges and disengages the drum altogether. The drum is then free to be rotated to any desired position and, by a rearward movement of the carriage, the stop pin can then be inserted in engaging position relative to the ridge selected.

The spindle 5 extends at one end to the exterior of the base 1 through a bearing plate 8; and a hand knob 9 is slidably keyed on this end of the spindle 5. A hand lever 10, with a relatively large hub, bored to fit freely around the spindle 5, is secured to the bearing plate 8 by two set screws 11, 11 extending through arcuate slots formed in the said hub and permitting a limited rotary movement of the hand lever 10 around the axis of the spindle 5. A coil spring 12 (Figs. 2 and 3), connected between a peripheral lug on the hub of hand lever 10 and a pin mounted on the bearing plate 8, tends to rotate the hub of the hand lever 10 in a clockwise direction about the axis of the spindle 5. A driving pin 13 protrudes from the surface of the hub of the hand lever 10, and is adapted to engage in any one of a circular series of corresponding holes $9^a$ formed in the inner end face of the hand knob 9 (Fig. 4). Each hole corresponds in position to one of the lonigtudinal ridges $4^a$ of the drum 4, which is keyed against rotation relatively to the spindle 5 by means of a pin $9^b$ (Fig. 2) the head of which engages in a corresponding slot in the axial bore of the drum 4. The spindle 5 is a sliding fit in the axial bore of the drum 4 and can be withdrawn to permit the said drum to be changed. However, to allow such a withdrawal of the spindle 5, a passageway for the pin $9^b$ must be provided in the bores for the spindle 5 in the base 1, the bearing plate 8 and the hub of the hand lever 10, and consequently an axial slot $1^a$ is provided in these bores.

The spring 12, through the intermediary of the hand lever 10, the driving pin 13, the hand knob 9 and the spindle 5, tends to rotate the drum 4 about its axis and wedge the stop pin 6 in one of the recesses $4^b$ to lock the carriage 2 in position relatively to the base 1. Depression of the hand lever 10 produces a limited anti-clockwise rotation of the drum 4 and frees the carriage 2 for movement by hand to a position in which the stop pin 6 may be engaged in another of the recesses 4$^b$ in the same longitudinal ridge 4$^a$. It will, consequently, be realized that the positions of recesses 4$^b$, in any one longitudinal ridge 4$^a$, determine the several longitudinal positions of the carriage 2.

The longitudinal positions of the recesses 4$^b$ in one longitudinal ridge 4$^a$ are different relative to the longitudinal positions of the recesses in another ridge; and to bring a different longitudinal ridge 4$^a$ into recess engaging relationship with the stop pin 6 to enable the carriage 2 to be locked in another series of longitudinal positions for the purpose hereinafter described, the hand knob 9, which is slidably keyed on the spindle 5, is pulled out against pressure of a spring 14 (Fig. 2) suitably arranged in the hub of the said hand knob 9, whereby the driving pin 13 is released from the hole 9$^a$ in the hub of the hand knob 9 with which it is engaged. The hand knob 9 is thus freed for rotation together with the spindle 5 and drum 4, to bring another longitudinal ridge 4$^a$ into operation. Release of the hand knob 9 causes the driving pin 13 to enter another hole 9$^a$ in the hub of the hand knob 9 corresponding in position to the longitudinal ridge 4$^a$ which it is desired to use. Moreover, as explained above, the construction is such that the drum 4 can be readily replaced by another drum the longitudinal ridges 4$^a$ of which are formed with a series of differently positioned recesses 4$^b$.

By reference again to Fig. 1, it will be seen that a table 15 is mounted by means of a pair of linear ball bearings 16 so as to be slidable in the transverse direction on the carriage 2. The table is positioned in predetermined transverse position relative to the carriage by the following means. Transverse movement of the table 15 with respect to the carriage 2 is limited by a pair of stops 17, 17 coating with abutments 18 secured to the carriage 2 by bracket 7. The stops 17 are adapted to slide in a groove machined in the front edge of the table 15. Knobs 19, 19 permit adjustment of the positions of the stops 17 with respect to the table 15, whilst screws 20, 20 adapted to bear against the abutments 18, 18 are provided to give a fine adjustment of the limits of travel of the table 15. The upper surface of the table 15 is an accurately machined, smooth surface on which is mounted a pair of support brackets 21, 21 which are adjustable in the transverse direction on the table 15 and can be locked in any desired position by actuation of the knobs 22, 22. The datum face 21$^a$ is provided on the left hand support bracket 21 to facilitate the setting of the instrument as will be explained hereunder.

Mounted on the inside faces of the upper ends of the support brackets 21, 21 are suitable, quickly releasable holders or chucks 23, 23$^a$ which are designed to support the blade B to be gauged and provided with suitable bores, V-grooves or the like, adapted to coact with corresponding bosses formed on the tips and the roots of the blades for the accurate and consistent location of each blade in the said holders or chucks 23, 23$^a$.

As illustrated in Fig. 1, a compressor blade B mounted in the holders or chucks 23, 23$^a$ is adapted to be moved, by longitudinal displacement of the carriage 2 and transverse displacement of the table 15, between an upper feeler wheel 24 and an anvil or lower feeler wheel 24$^a$. The feeler wheels control a dial-type indicator 25, which in this apparatus, reads to .0001 of an inch.

Since the detailed operation of the apparatus is dependent upon the part to be gauged, the checking of a forged alloy compressor blade for a gas turbine engine will be described by way of example. Such a blade is shown mounted in the machine in Fig. 1. The thickness of the blade is to be checked at two stations or positions along the axial length of the blade. Three dimensions are to be checked at each of these stations, namely: the thickness adjacent the leading edge; the thickness on the central axis of the blade; and the thickness adjacent the trailing edge of the blade. A locating boss is forged on the blade adjacent the tip thereof and the distance of each station from this boss, the distance of each checking point from the central axis of the blade at each station, and the specified dimensions at all of these points, using a certain diameter of feeler wheels 24, 24$^a$, are calculated beforehand. The above-mentioned locating boss forged on the blade is adapted to engage in a corresponding bore formed in the left-hand holder or chuck 23, whereby the blade, and the positions of the checking stations thereon, are accurately located with respect to the left-hand support bracket 21. A distance piece, engaging the datum face 21$^a$ and one of the flat faces of the feeler wheels 24, 24$^a$, is used to set the distance of the left-hand support bracket 21 from the feeler wheels 24, 24$^a$. The length of the distance piece is calculated to ensure that a blade secured in the holder or chuck 23 of the left-hand support bracket 21 is positioned so that the feeler wheels 24, 24$^a$ contact the blade at one of the predetermined checking stations. With the distance piece in position, the left-hand stop 17 is adjusted so that its screw 20 engages the corresponding abutment 18.

By use, for example, of a gauge block of suitable thickness placed between the abutment 18 and the screw 20 of the right-hand stop 17, the position of the right-hand stop 17 is determined to fix the other checking station to which the blade is carried by transverse movement of the table 15. The blade is now mounted in the holders or chucks 23, 23$^a$. The position of the right-hand support bracket 21 may be adjusted with respect to the table 15 to accommodate the base or root of the blade without upsetting the above-described adjustments, since the positions of the two checking stations for the blade are determined by the setting of the left-hand support bracket 21 and the two stops 17, 17 all of which are clamped to one and the same table 15.

A V-shaped recess (not shown) is provided in the holder or chuck 23$^a$ and engages a spigot forged on the blade. The purpose of this recess is to provide location of the blade in a longitudinal direction while the jaws of the chuck establish its vertical location. As shown in Fig. 1, the holder or chuck 23 is advantageously vertically, adjustably mounted in a slideway formed in the end of one of the support brackets 21. By these means the horizontal level of the blade axis can be adjusted. However, a slight departure of the axis of the blade from the horizontal will not produce any serious error in the blade thickness reading.

As previously described, the transverse recesses 4$^b$ in each longitudinal ridge 4$^a$ serve to locate longitudinal positions of the carriage 2, and hence positions of the feeler wheels 24, 24$^a$ with respect to the width of the blade. The positions of the recesses 4$^b$ are predetermined to suit the blades to be checked. If necessary, one recessed ridge 4$^a$ may be used in connection with one station on the blade and a different ridge 4$^a$ may be used at another blade station. In any case, where different series of blades are to be checked, suitably recessed ridges 4$^a$ are provided for the respective series.

After a blade has been mounted in the holders or chucks 23, 23$^a$ and the positions of the stops 17, 17 have been set, the hand knob 9 is actuated to rotate the drum 4 to bring the longitudinal ridge 4$^a$, appropriate to the type of blade, into recess engaging relationship with the stop pin 6 of the carriage 2. The table 15 is now moved into the corresponding end transverse position determined by one of the stops 17. By the operation of the hand lever 10 the carriage 2 may be moved longitudinally successively into the three positions determined by the transverse recesses 4$^b$ in the longitudinal ridge 4$^a$ in use. Three predetermined points at this blade station are, therefore, brought between the feeler wheels 24, 24$^a$ and the dimensions at these three points are read from the dial indicator 25. The table 15 is then moved to the other transverse end position thereof and three more readings obtained at this station of the blade. If necessary, another longitudinal ridge 4ª of the locating drum 4 is used at this second station. The readings obtained for these six dimensions of the blade are then checked with the figures specified for these dimensions.

In the case of twisted blades, or blades of highly cambered aerofoil, the construction of the holders or chucks 23, 23ª is advantageously such as to permit rotation of each blade about the longitudinal axis thereof, to enable a truer reading of the blade thickness at any point to be obtained.

In another embodiment of the invention, the blade mounting may remain stationary whilst the gauge mechanism is movable in respect thereto. In this construction, the pedestal 26 may be mounted for example, on the table 15 and the supports 21, 21 mounted on the base 1. In a further embodiment, the gauge means is movable in one direction and the mounting means is movable in second direction. If desired, more than one gauge means may be provided for measurement of dimensions in more than one plane.

Moreover, the invention is not limited to movement of the part to be gauged in the horizontal plane as described with reference to the construction illustrated in the drawings, nor need the axis of the gauge mechanism be vertical, but various changes in the arrangement and construction of the apparatus may be effected without exceeding the scope of the invention.

What we claim as our invention is:

1. Indexing means for gauge apparatus, comprising a base, a carriage mounted on the base for back and forth longitudinal sliding movement, a drum mounted for rotation about an axis parallel to the direction of movement of the carriage and having at least two spaced longitudinal ridges in its periphery and transverse recesses in the ridges, the longitudinal positions of the recesses in one ridge being different relative to the longitudinal positions of the recesses in another ridge and a stop pin mounted on one of the base and carriage and adapted to enter any of said recesses to position the carriage in several predetermined longitudinal positions relative to said base.

2. Indexing means as claimed in claim 1, including means urging the drum to rotate in one direction to cause an inter-engagement of the pin and a recess and manually operable means for rotating the drum in the opposite direction to disengage the pin and the recess.

3. Indexing means as claimed in claim 1, including means for rotating the drum to cause the pin to enter a recess and means for further rotating the drum to bring a different ridge into recess engaging relationship with the pin.

References Cited in the file of this patent

UNITED STATES PATENTS

| | | |
|---|---|---|
| 367,473 | Tickell | Aug. 2, 1887 |
| 1,152,761 | Provost | Sept. 7, 1915 |
| 1,258,137 | Neth | Mar. 5, 1918 |
| 1,943,638 | Swanson | Jan. 16, 1934 |
| 2,178,264 | Meyer | Oct. 31, 1939 |
| 2,278,945 | Reason et al. | Apr. 7, 1942 |
| 2,324,476 | Becker | July 20, 1943 |
| 2,345,312 | Sorensen | Mar. 28, 1944 |
| 2,431,021 | Bourdelais | Nov. 18, 1947 |
| 2,452,089 | Wiken et al. | Oct. 26, 1948 |
| 2,486,645 | Hager | Nov. 1, 1949 |
| 2,495,891 | Davis | Jan. 31, 1950 |
| 2,497,199 | Aller | Feb. 14, 1950 |
| 2,503,392 | Kreipl | Apr. 11, 1950 |